Sept. 24, 1946.  W. D. TIPTON  2,408,008
HYDRODYNAMIC TRANSMISSION
Filed Feb. 17, 1944  2 Sheets-Sheet 2
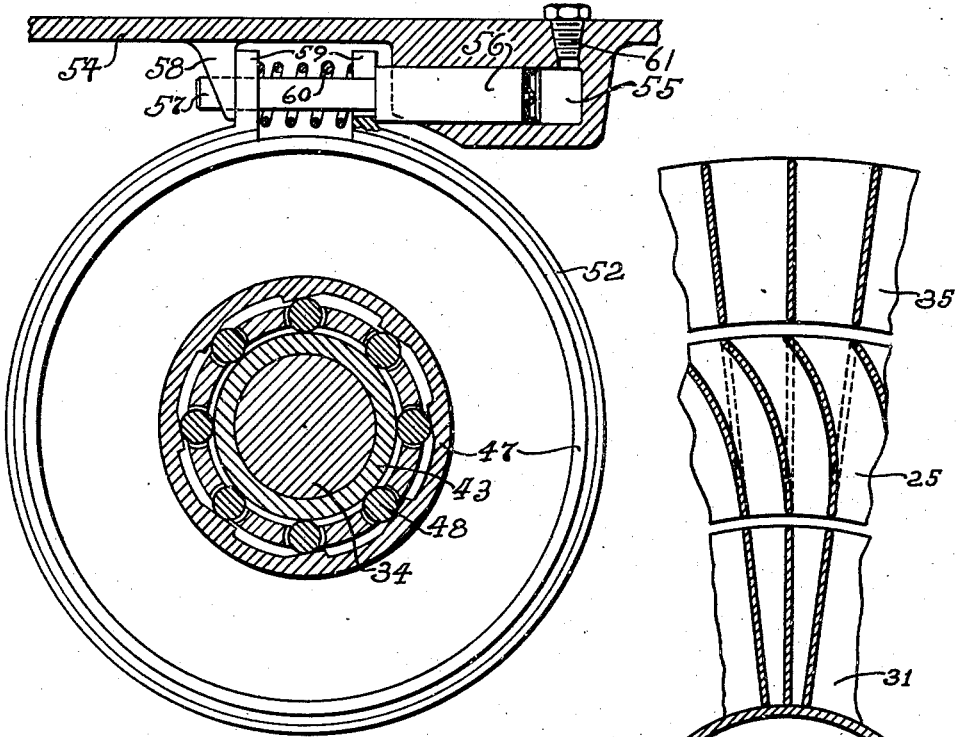
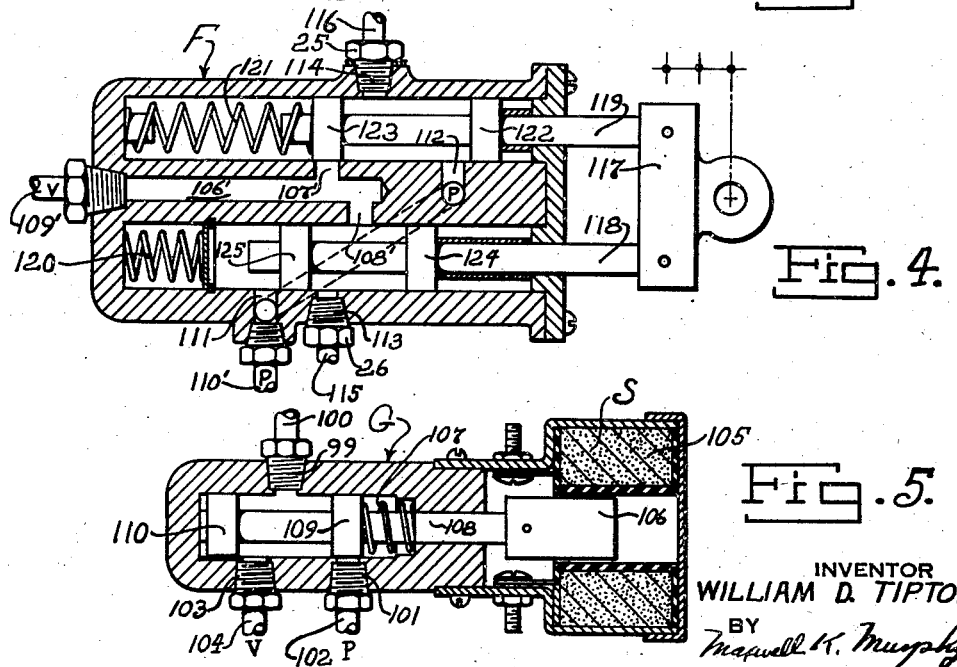
INVENTOR
WILLIAM D. TIPTON
BY
Maxwell K. Murphy
ATTORNEY Patented Sept. 24, 1946

2,408,008

UNITED STATES PATENT OFFICE 2,408,008

HYDRODYNAMIC TRANSMISSION

William D. Tipton, Stoneleigh, Md.; Elizabeth B. Tipton executrix of said William D. Tipton, deceased Application February 17, 1944, Serial No. 522,735

7 Claims. (Cl. 74—189.5)

This invention relates to hydrodynamic transmissions, particularly to those types which embody a fluid torque converter and a gearset in combination; and is an improvement over the arrangement disclosed and claimed in my previously issued Patent No. 2,306,834, issued Dec. 29, 1942.

The principal object of this invention is to provide an improved automatically variable ratio power transmission of the aforesaid type for automotive use wherein the major portion of the engine torque is transmitted mechanically under vehicle direct drive conditions.

Another object is to provide an improved power transmission of the fluid type wherein the hydraulic power transmitting structure will function as a torque multiplier during vehicle operation under conditions of high torque demand, and as a fluid coupling of the kinetic type under conditions of low torque demand.

Still another object is to provide in such a transmission means for automatically adjusting the driving ratio to accommodate varying conditions of drive.

A further object is to provide in such a device, means for increasing the overall operating efficiency while maintaining the desirable cushioned drive and good accelerating characteristics.

A still further object is to provide in connection with such a transmission, an automatically operable and foolproof "no-back" or "hill-hold."

Other objects and advantages of the device will become apparent from a reading of the following description.

Further objects and advantages of the invention will become apparent from the following description.

Reference is now made to the accompanying drawings in which reference characters have been used to designate corresponding parts referred to in the description, and wherein Fig. 1 is a longitudinal central sectional view of a preferred embodiment of the power transmission.

Fig. 2 is an enlarged fragmentary sectional view of the fluid directing vanes, the three sets of vanes being shown in a single plane for convenience.

Fig. 3 is a section taken along line 3—3 of Fig. 1.

Fig. 4 is an enlarged sectional view of valve F of Fig. 1, and

Fig. 5 is a similar view of valve G.

Figure 1:
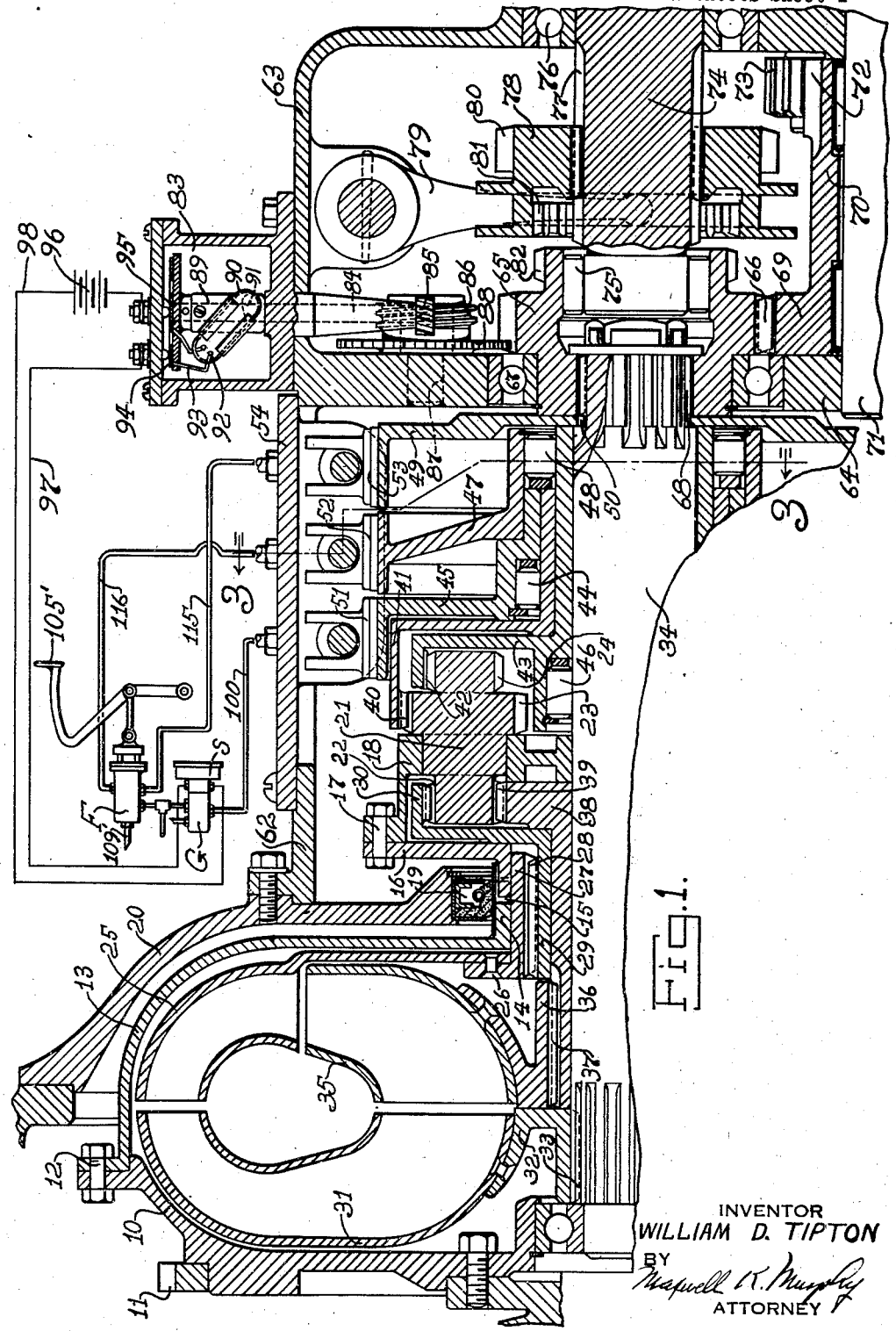

Referring to the drawings, 10 designates the flywheel of a vehicle engine which carries the usual starting gear 11. Bolted to the flywheel 10 at 12 is a shell-like housing member 13 which encloses the hydraulic unit and has a rearwardly extending portion 14 to which is attached by means of a jaw clutch 15, a plate-like member 16. The latter is fastened by bolts 17 to a carrier member 18. A resilient sealing assembly 19 of any suitable design is provided between the housing 20 and rearward extension 14 as illustrated.

The carrier 18 carries a plurality (preferably three) of planetary gear elements 21, each being provided with three sets of gear teeth, designated respectively 22, 23 and 24, the purpose of which will be presently made clear.

The hydraulic unit comprises three relatively rotatable vaned wheels 25, 31 and 35. The wheel 35 serves as an impeller and carries a sleeve 36. The wheel 25 is adapted to serve both as an impeller and as a guide or reaction wheel under different operating conditions and is fastened at 26 to a sleeve 27, the latter being splined at 28 to the forwardly extending portion 29 of an annulus gear 30. The runner or turbine wheel 31 is carried by a hub 32 splined at 33 on the output shaft 34.

Fig. 2 illustrates the shape of the vanes of the three wheels. The impeller and runner wheels 35 and 31 may have straight or curved vanes and the wheel 25 which acts as either an impeller or a guide wheel has curved vanes.

The sleeve 36 carried by the impeller 35 is splined at 37 to the forwardly extended hub of a sun gear 38. The gear 38 has teeth 39 which mesh with the teeth 22 of planet gears 21. The teeth 23 of the planet gears mesh with teeth 40 of an annulus gear 41, and the teeth 24 of the planet gears mesh with teeth 42 of a smaller annulus gear 43. The gears 41 and 43 are disposed in telescoping relationship as illustrated and are rotatable with respect to each other and shaft 34.

Gear 41 has a rearwardly extending hub which is adapted to be drivingly connected by means of a one-way clutch 44 with a brake drum 45. Gear 43 has both forwardly and rearwardly extending hubs. The forward extension thereof is adapted for driving connection with shaft 34 by one-way clutch 46, and the rearward extension is adapted for driving connection with a brake drum 47 by one-way clutch 48.

The clutches 44, 46 and 48 are of the well known cam and roller type and are so arranged that shaft 34 can overrun gear 43, gear 41 can overrun brake drum 45 and gear 43 can overrun brake drum 47.

A third brake drum 49 is splined at 50 to the mainshaft 34 and thus functions when locked to hold the shaft 34 stationary.

The drums 45, 47 and 49 are respectively controlled by brake bands 51, 52 and 53. These bands are similar in construction and are hydraulically actuated. The mechanism for operating band 52 is shown in detail in Fig. 3. As illustrated, housing plate 54 carries a fluid cylinder 55 in which is disposed a reciprocable piston 56. Piston 56 has a reduced extension 57 supported in a boss 58. The brake band 52 has a pair of ears 59 normally urged apart by a coil spring 60. The piston extension 57 passes through holes in the ears and carries the spring 60. Fluid under pressure introduced through port 61 will tighten the brake band and restrain rotation of the drum 47.

Suitably attached to the rear end of the housing 62 is a housing 63 which contains a forward and reverse gearset. The latter comprises a gear 65 rotatably mounted by means of a ball bearing 67 in wall 64 of casing 63. Gear 65 is splined on shaft 34 at 68 and has teeth 66 disposed in mesh with a countershaft gear 69. The latter is one of a cluster 70 carried on countershaft 71. A second countershaft gear 72 meshes with an idler gear 73 which is suitably mounted in the casing.

Piloted in the hollow bore of gear 65 is one end of a shaft 74, a roller bearing 75 being disposed between the shaft and gear. The shaft 74 is rotatably supported at its rear end by a bearing 76 and constitutes the final driven shaft of the transmission.

Slidably mounted on splines 77 is a clutch member 78 which is adapted to be shifted axially of the housing by a shifter fork 79 in the usual manner. Clutch member 78 has teeth 80 adapted to mesh with idler 73 upon rearward shift thereof, and clutch teeth 81 adapted to mesh with clutch teeth 82 carried by gear 65 upon forward shift.

As can be readily understood, the clutch member 78 may be shifted from its illustrated neutral position rearwardly to engage idler 73 for reverse drive, or forwardly to engage gear 65 for forward drive.

Mounted on top of casing 63 is a governor mechanism 83. This comprises a shaft 84 having a worm pinion 85 at its lower end. The latter engages a worm 86 which is carried by a shaft 87 mounted in the wall 64. This shaft also carries a gear 88 which engages and is driven by gear 65. Shaft 84 carries a collar 89 which in turn carries a closed tube 90 of non-conducting material, mounted as shown. In the tube 90 is a globule of mercury 91. The tube is inclined such that the globule normally rests in the lower end thereof. The upper end of the tube has a pair of electrical contacts 92, which are connected by flexible conductors 93 to a pair of slip rings 94, 95.

Slip ring 95 is connected to one side of a battery 96 (preferably the regular car battery) and slip ring 94 is connected by a wire 97 with a solenoid S (Fig. 5) which forms part of a control valve G. The other side of solenoid S is connected by wire 98 with the battery 96. Valve G is shown in venting position. Port 99 thereof is connected by a pipe 100 with the operating cylinder of brake band 51; port 101 is connected by pipe 102 with a source of fluid pressure (the engine lubricating system for example) and port 103 vents to the sump through pipe 104.

Solenoid S has the usual field coil 105 and core 106. A coil spring 107 biases the valve stem 108 (which is formed integrally with core 106) to venting position. The stem has a pair of enlarged portions 109, 110 which permit communication between port 99 and either port 101 or 103 depending upon the valve positions.

It is clear therefore that valve G will remain in its illustrated position and brake drum 45 will be free for rotation so long as the mercury globule 91 remains in the bottom of tube 90. The tube 90 will be revolved about the axis of shaft 84 whenever shaft 34 is rotated, and at some predetermined speed of shaft 34 the globule 91 will be forced upwardly in the tube by centrifugal force and contacts 92 will be bridged whereupon solenoid S will be energized and valve G will be operated to close off vent port 103 and open pressure port 101. Brake band 51 will thus be set.

Brake bands 52 and 53 are operated manually by means of pedal 105' and valve F. Pedal 105' corresponds somewhat to the conventional clutch pedal in its operation. Valve F (Fig. 4) has a vent passage 106' which connects vent ports 107', 108' with the sump through pipe 109'. A pipe 110' supplies fluid pressure to pressure ports 111, 112. Port 113 connects with the operating cylinder of brake band 53 through pipe 115, and port 114 connects with the operating cylinder of brake band 52 through pipe 116.

Pedal 105' is operably connected with a crosshead 117 which is in turn operably connected with valve stems 118 and 119. Coil springs 120, 121 urge the respective stems 118, 119 toward the right of Fig. 4. Stem 118 has enlarged portions 124, 125 formed thereon and stem 119 has similar portions 122, 123.

The respective enlarged stem portions are so arranged that depression of pedal 105' one half of its stroke will cut off pressure port 112 and open vent port 107' without affecting the relationship of ports in the lower valve chamber. Further depression of the pedal to the limit of its stroke will close vent port 108' and open pressure port 111 without affecting the relationship of ports in the upper valve chamber.

The effect of this operation characteristic of valve F is to release band 52 (which is normally set as above explained in connection with Fig. 3) by depression of pedal 105' half way and to set brake band 53 by full depression of the pedal while maintaining band 52 released. The significance of this will be more fully explained below.

The operation of my improved transmission is as follows:

With the vehicle at rest with its engine running and the parts in their illustrated positions, brake drum 47 is stationary because of the pressure in cylinder 55. Annulus gear 43 is therefore held against reverse rotation and forms a reaction point for the planetary gearset. Flywheel 10, housing 13, plate 16 and carrier 18 are rotating at engine speed, and planet gears 21 are rotated due to the teeth 42 being held.

The hydraulic wheels 25 and 35 are thus caused to rotate forwardly with carrier 18, the impeller 35 turning in excess of input speed and the wheel 25 turning slowly in accordance with the relationship set up by the planetary gear ratios and thus functions as a reaction or guide wheel for the hydraulic unit. The vehicle remains stationary because of clutch 78 being in neutral.

Pedal 105' is now depressed fully releasing drum 47 and setting band 53. This removes the reaction point from the planetary gearset and locks shaft 34 and gear 65 against rotation. Shifter fork 79 may now be manipulated to engage teeth 80 with gear 73 for reverse drive or to engage teeth 81 with teeth 82 for forward drive. Let it be assumed that forward drive is established.

Pedal 105' is then released locking gear 43. Gear 30 which is driven by wheel 25 may be larger than gear 43 as shown, but is preferably of the same size whereupon it remains stationary. Impeller 35 turns forwardly at greater-than-input speed because of the step-up in ratio.

Note that under these conditions, one-way clutch 46 which prevents reverse rotation of shaft 34, functions as a "no-back" or "hill-hold" device and prevents the car from rolling backward when stopped on an upgrade. This "hillhold" can be made ineffective in case the driver desires to let the vehicle drift backwards by depressing pedal 105' half way. This releases drum 47 which has held gear 43 stationary through one-way clutch 48.

As the engine is speeded up, impeller 35 delivers fluid to guide wheel 25 which is turning forwardly slowly or is stationary in accordance with the relative diameters of gears 30 and 43. The outflow from wheel 25 enters the passages of runner 31 which drives the final drive shaft 74 through shaft 34, gear 65 and clutch member 78. This condition of drive corresponds to conventional low speed drive.

When the vehicle has reached a speed of, say 8 M. P. H., governor mechanism 83 functions automatically to set brake band 51 and thus stop drum 45. This stops gear 41 from rotating through the action of overrunning clutch 44 and causes guide wheel 25 to be rotated forwardly at increased relative speed because of the relative sizes of gears 41 and 30. Car is now in second speed stage and acceleration continues until the torque demand of shaft 34 is less than that supplied by guide wheel 25.

The diameters of wheels 25 and 35 and the ratios of gears 30 and 38 are such that, under normal conditions, the wheel 25 will tend to overrun wheel 35, and when there is a sudden increase in torque demand such as during acceleration, the increased reaction against wheel 25 will cause it to lag behind and rest against brake drum 45 or 47 depending upon which of the brakes is set.

When torque demand decreases to a value less than that being supplied by wheel 25 under the above described second speed driving conditions, wheel 25 speeds up to the speed of runner 31. This causes a corresponding relative speed-up of gear 43 which now tends to overrun shaft 34. One-way clutch 46 now functions to clutch gear 43 to shaft 34 and the entire planetary unit rotates as a unit, the gear 41 idling. This condition is the third speed ratio or direct drive condition.

Note that wheels 25 and 31 are now turning as a unit, thus the wheel 25 functions in direct drive as a runner and wheel 35 functions as an impeller slipping slightly with respect to wheels 25 and 31 as in a two-element fluid coupling of the kinetic type.

In direct drive, most of the engine torque is transmitted mechanically to shaft 34 through shell 13, planet carrier 18, planet gear 21, annulus gear 43 and clutch 46. The remainder is transmitted hydraulically through runner 31, thus the slippage present in ordinary torque converter and fluid coupling transmissions is reduced to an extremely low value with consequent gain in overall efficiency.

If, when running in direct drive, the driver desires to accelerate the vehicle, opening of the throttle will cause a sudden torque increase on carrier 18 which because of the difference in gear sizes will speed up wheel 35. This will, in turn, cause increased fluid velocity in the fluid circuit and increased reaction on wheel 25. The latter will slow down and react against brake drum 45 (which is set) through the action of gears 30, 21, 43 and clutch 44, and will rotate at less-than-input speed depending upon the predetermined ratio of gears 21 and 41. The vehicle has now returned to second speed ratio condition. This return or "step-down" is entirely automatic and is the result of additional torque supplied or increased torque demand on shaft 34, or both. Thus it is seen that the equivalent of the well-known "kickdown" is present without the necessity of any conscious effort on the part of the driver.

Restoration of direct drive is automatic when the torque difference between flywheel 10 and shaft 34 disappears.

It may therefore be seen that I have provided an improved hydrodynamic drive which is simple in construction, economical to build, entirely automatic in operation, and which operates at a higher efficiency than those heretofore used.

Having thus described a specific embodiment of my invention, I wish to point out that such has been done for illustrative purposes only and it is not intended to limit the breadth or scope of the invention in the broader aspects thereof except as set forth in the claims appended below.

I claim:

1. In a fluid power transmission having a driving structure and a driven structure, a runner wheel carried by the driven structure; a second vaned wheel arranged in series relation with the runner wheel and adapted to act either as a runner wheel or as a guide wheel; a vaned impeller wheel arranged in series relation with the aforesaid wheels; differential gear means for coupling said second wheel and said impeller to the driving structure, said gear means being constructed and arranged such that the rotational speed of said second wheel and said impeller varies in accordance with the fluid reaction imposed on said second wheel as a consequence of torque demand on said driven structure; and means operably associated with said gear means for coupling said second wheel to said driven structure in response to equalization of torque demand on said runner and said second wheel.

2. In a fluid power transmission having a driving structure and a driven structure, a runner wheel drivingly connected to the driven structure; a pair of hydraulic wheels of different diameter disposed in driving relation with said runner wheel; a planet carrier driven by the driving structure; a planet pinion on said carrier; two sets of teeth on said pinion; an annulus gear meshing with one set of teeth and drivingly connected with the larger of said wheels; a sun gear meshing with said teeth and drivingly connected with the smaller wheel; a second annulus gear meshing with the second set of pinion teeth; brake means including a brake drum; an overrunning brake device operably disposed between said second annulus gear and said brake drum for preventing reverse rotation of said gear when said brake is set; and an overrunning clutch device operably disposed between said second annulus gear and said driven structure for drivingly coupling said gear to said driven structure in response to tendency of said gear to overrun said structure.

3. In a fluid power transmission having a driving structure and a driven structure, a runner wheel drivingly connected to the driven structure; a pair of hydraulic wheels of different diameter disposed in driving relation with said runner wheel; a planet carrier driven by the driving structure; a planet pinion on said carrier; two sets of teeth on said pinion; an annulus gear meshing with one set of teeth and drivingly connected with the larger of said wheels; a sun gear meshing with said teeth and drivingly connected with the smaller wheel; a second annulus gear meshing with the second set of pinion teeth; said second annulus being the diameter of or smaller than said first annulus; and means for automatically clutching said second annulus to said driven structure in response to tendency of said gear to overrun said structure.

4. In a fluid power transmission having a driving structure and a driven structure, a runner wheel drivingly connected to the driven structure; a pair of hydraulic wheels of different diameter disposed in driving relation with said runner wheel; a planet carrier driven by the driving structure; a planet pinion on said carrier; two sets of teeth on said pinion; an annulus gear meshing with one set of teeth and drivingly connected with the larger of said wheels; a sun gear meshing with said teeth and drivingly connected with the smaller wheel; a second annulus gear meshing with the second set of pinion teeth; means for restraining said second annulus against reverse rotation whereby said larger wheel may act as a guide wheel; and means for automatically coupling said second annulus to said driven structure in response to tendency of said gear to overrun said structure.

5. In a fluid power transmission having a driving structure and a driven structure, a runner wheel drivingly connected to the driven structure; a pair of hydraulic wheels of different diameter disposed in driving relation with said runner wheel; a planet carrier driven by the driving structure; a planet pinion on said carrier; three sets of teeth on said pinion; an annulus gear meshing with one set of teeth and drivingly connected with the larger of said wheels; a sun gear meshing with said teeth and drivingly connected with the smaller wheel; a second annulus gear meshing with a second set of pinion teeth; a third annulus gear of larger diameter than said second annulus gear meshing with the third set of pinion teeth; means for selectively restraining reverse rotation of said second and third gears while permitting free forward rotation thereof; said means for restraining the annulus gear of larger diameter including a governor means responsive to the speed of said driven structure.

6. In a fluid power transmission having a driving structure and a driven structure, a runner wheel drivingly connected to the driven structure; a pair of hydraulic wheels of different diameter disposed in driving relation with said runner wheel; a planet carrier driven by the driving structure; a planet pinion on said carrier; two sets of teeth on said pinion; an annulus gear meshing with one set of teeth and drivingly connected with the larger of said wheels; a sun gear meshing with said teeth and drivingly connected with the smaller wheel; a second annulus gear meshing with the second set of pinion teeth; brake means including a brake drum; an overrunning brake device operably disposed between said second annulus gear and said brake drum for preventing reverse rotation of said gear when said brake is set; and an overrunning clutch device operably disposed between said second annulus gear and said driven structure for preventing reverse rotation of said driven structure with respect to said gear.

7. In a hydrodynamic transmission for an automotive vehicle, a pair of series arranged hydraulic wheels; planetary gear means for connecting said wheels with the vehicle engine; a third hydraulic wheel arranged in series with the aforesaid wheels and connected to the vehicle driving wheels; said planetary gear means including a planet pinion having a plurality of sets of teeth; an annulus gear disposed in mesh with one set of teeth; a second annulus gear disposed in mesh with a second set of teeth; selectively operable brake means for controlling rotation of said annulus gears, and means including governor means operably responsive to the speed of the third wheel for controlling said brake means.

WILLIAM D. TIPTON.